(12) United States Patent
Takahashi (10) Patent No.: US 7,945,245 B2
(45) Date of Patent: May 17, 2011

(54) AUTHENTICATION SYSTEM AND AUTHENTICATION METHOD FOR PERFORMING AUTHENTICATION OF WIRELESS TERMINAL

(75) Inventor: Masatsugu Takahashi, Kanagawa (JP)

(73) Assignee: NEC Infrotia Corporation, Kanagawa (JP)

( * ) Notice: Subject to any disclaimer, the term of this patent is extended or adjusted under 35 U.S.C. 154(b) by 938 days.

(21) Appl. No.: 11/842,707

(22) Filed: Aug. 21, 2007

(65) Prior Publication Data

US 2008/0051061 A1 Feb. 28, 2008

(30) Foreign Application Priority Data

Aug. 22, 2006 (JP) .................................. 2006-225370

(51) Int. Cl.
*H04M 1/66* (2006.01)
(52) U.S. Cl. ............... 455/411; 455/410; 455/432.3; 455/419; 370/338; 370/401; 709/203; 380/247
(58) Field of Classification Search .......... 455/410–411, 455/432.1–433; 370/328, 338, 352, 401
See application file for complete search history.

(56) References Cited

U.S. PATENT DOCUMENTS

| | | | | |
|---|---|---|---|---|
| 5,163,097 | A * | 11/1992 | Pegg | 713/183 |
| 6,167,255 | A * | 12/2000 | Kennedy et al. | 455/414.1 |
| 6,212,390 | B1 * | 4/2001 | Rune | 455/456.6 |
| 6,282,193 | B1 * | 8/2001 | Hluchyj et al. | 370/356 |
| 6,421,714 | B1 * | 7/2002 | Rai et al. | 709/217 |
| 6,785,256 | B2 * | 8/2004 | O'Neill | 370/338 |
| 6,795,705 | B1 * | 9/2004 | Warrier et al. | 455/435.1 |
| 7,058,180 | B2 * | 6/2006 | Ferchichi et al. | 380/247 |
| 7,188,185 | B2 * | 3/2007 | Dowling | 709/230 |
| 7,522,907 | B2 * | 4/2009 | Lupper et al. | 455/411 |
| 7,525,937 | B2 * | 4/2009 | O'Neill | 370/328 |
| 7,577,659 | B2 * | 8/2009 | Schutz et al. | 1/1 |
| 7,822,406 | B2 * | 10/2010 | Lee et al. | 455/411 |
| 2003/0176188 | A1 * | 9/2003 | O'Neill | 455/433 |
| 2006/0002356 | A1 * | 1/2006 | Barany et al. | 370/338 |
| 2007/0254630 | A1 * | 11/2007 | Moloney et al. | 455/410 |
| 2008/0160960 | A1 * | 7/2008 | ElRif et al. | 455/411 |
| 2008/0318550 | A1 * | 12/2008 | DeAtley | 455/411 |
| 2009/0034451 | A1 * | 2/2009 | Warrier | 370/328 |

FOREIGN PATENT DOCUMENTS

| | | |
|---|---|---|
| JP | 9-322246 A | 12/1997 |
| JP | 2001-346257 A | 12/2001 |
| JP | 2002-55960 A | 2/2002 |
| JP | 2002-064861 A | 2/2002 |
| JP | 2002-324052 A | 11/2002 |
| JP | 2002-345033 A | 11/2002 |
| JP | 2005-311720 A | 11/2005 |

* cited by examiner

*Primary Examiner* — Sharad Rampuria
(74) *Attorney, Agent, or Firm* — Sughrue Mion, PLLC

(57) ABSTRACT

An authentication system for performing authentication of a wireless terminal is a system that issues an authentication request to an authentication server connected to a communication network and includes a wireless base station and an authentication server. The wireless base station includes: an authentication information acquisition means for acquiring authentication information from a wireless connection request packet; and an authentication request transmission means for transmitting the authentication information acquired by the authentication information acquisition means and RAS unique information registered in the wireless base station to the authentication server. The authentication server includes a means for acquiring the transmitted authentication information and RAS unique information and comparing the acquired authentication information and RAS unique information with previously registered wireless terminal authentication information previously registered to determine whether or not they coincide with each other. In the case where the acquired authentication information and RAS unique information and previously registered wireless terminal authentication information coincide with each other, the wireless terminal is authenticated.

8 Claims, 5 Drawing Sheets

FIG.4

| USER ID | PASSWORD | RAS UNIQUE INFORMATION | VALIDITY PERIOD |
|---------|----------|------------------------|-----------------|
| abcdef  | 123456   | AP001                  | 2006.03.20 23:30 |
| ghijklm | 7890123  | AP002                  | 2006.03.19 22:30 |
| nopqrs  | 4567890  | AP001                  | 2006.03.20 21:00 |

AUTHENTICATION SYSTEM AND AUTHENTICATION METHOD FOR PERFORMING AUTHENTICATION OF WIRELESS TERMINAL

BACKGROUND OF THE INVENTION

1. Field of the Invention

The present invention relates to an authentication system and authentication method for performing authentication of a wireless terminal that issues an authentication request to an authentication server connected to a communication network through a wireless base station and, more particularly, to an authentication system and authentication method in which an authentication server uses an RAS (Remote Access Service) unique information unique to a wireless base station to perform authentication of a wireless terminal.

2. Description of the Related Art

As a conventional system for performing authentication of a wireless terminal, there is known one in which a wireless terminal issues an authentication request including authentication information such as user ID (identification) and password to a wireless base station, and the wireless base station performs an authentication determination for the received authentication request or asks an authentication server in which authentication information has been registered for the authentication determination to thereby accept or reject an access of the wireless terminal to a network service.

As a conventional system for performing authentication of a wireless terminal, a typical authentication system disclosed in Patent Document 1 (JP-2002-324052-A) will be described below with reference to FIG. 5.

Figure 5:
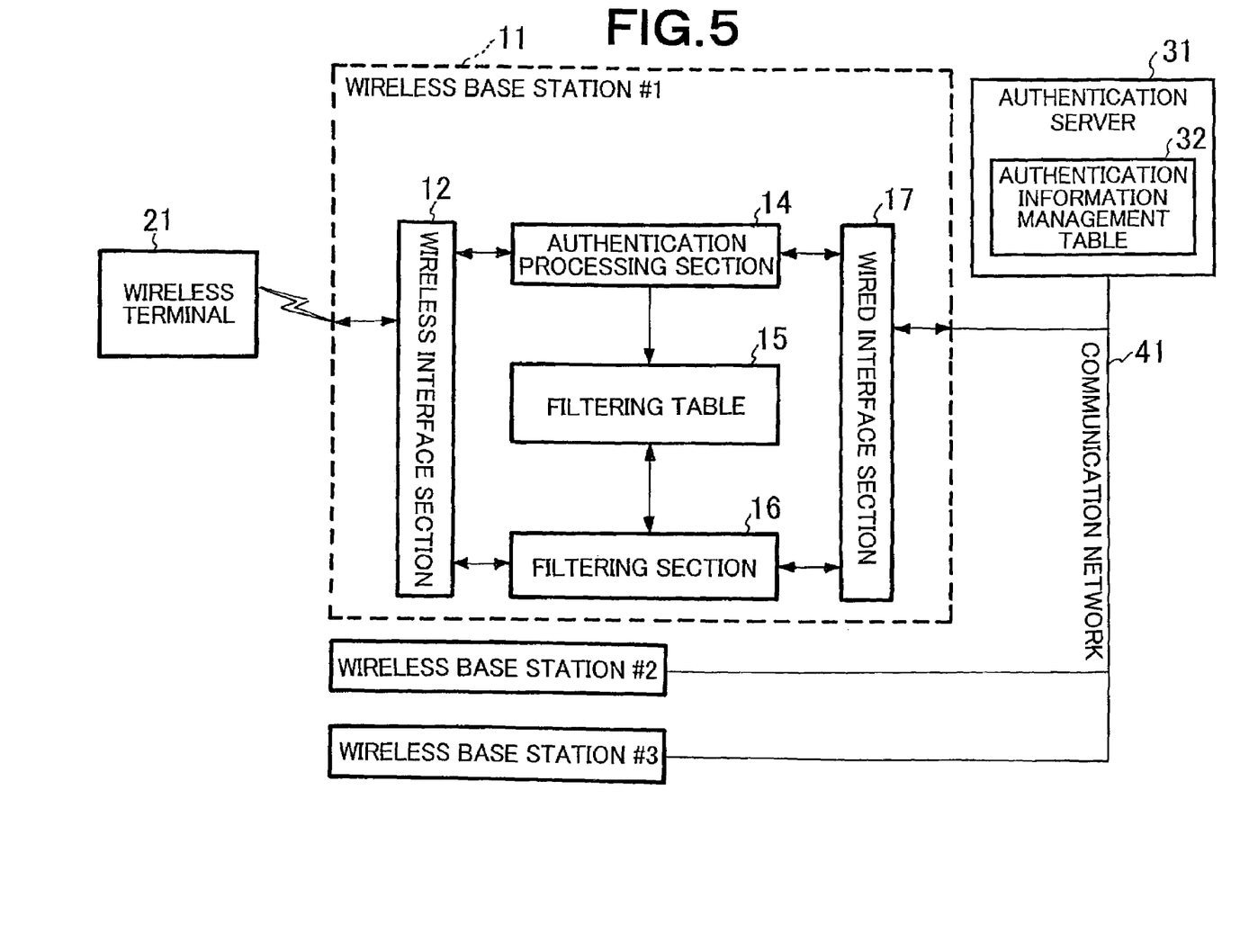
FIG. 5 is a view showing a typical configuration of a conventional wireless terminal authentication system.

A system for performing authentication of a wireless terminal shown in FIG. 5 includes a first wireless base station #1, a second wireless base station #2, a third wireless base station #3, a wireless terminal 21, an authentication server 31, and a communication network 41.

The first wireless base station #1 (wireless base station 11) includes a wireless interface section 12, an authentication processing section 14, a filtering table 15, a filtering section 16, and a wired interface section 17.

The second and third wireless base stations #2 and #3 have the same configuration as that of the wireless base station 11 and, as shown in FIG. 5, a plurality of wireless base stations are connected to the communication network 41.

The wireless base station 11 is connected to the authentication server 31 through the communication network 41. Upon receiving an authentication request including authentication information such as user ID and password from the wireless terminal 21, the wireless base station 11 asks the authentication server 31 in which authentication information has been registered for the authentication determination to thereby accept or reject an access of the wireless terminal 21 to a network service.

When the wireless terminal 21 is once authenticated by the authentication server 31 and access to a communication network is allowed, the wireless base station 11 stores the terminal ID of the wireless terminal 21 in the filtering table 15. That is, the acceptance/rejection determination for the wireless terminal 21 to be performed within the wireless base station 11 is made based on whether the terminal ID stored in the filtering table 15 coincides with the received terminal ID.

The wireless interface section 12 of the wireless base station 11 performs wireless communication with the wireless terminal 21 to exchange packets therewith. Then, the wireless interface section 12 determines whether a received packet is a wireless connection request packet. If the received packet is the wireless connection request packet, the wireless interface section 12 extracts authentication information and terminal ID from the received wireless connection request packet. If the received packet is not the wireless connection request packet, the wireless interface section 12 extracts terminal ID from the received packet.

If a received packet is a wireless connection request packet, the authentication processing section 14 acquires authentication information and terminal ID from the wireless interface section 12, generates an authentication request packet including the received authentication information, and transmits the generated authentication request packet to the authentication server 31 through the wired interface section 17 and communication network 41.

The authentication processing section 14 receives an authentication reply from the authentication server 31 through the communication network 41 and wired interface section 17. If the authentication reply indicates "authentication acceptance", the authentication processing section 14 stores the terminal ID in the filtering table 15 and transmits a wireless connection acceptance packet to the wireless terminal 21. If the authentication reply indicates "authentication rejection", the authentication processing section 14 does not store the terminal ID in the filtering table 15 but transmits a wireless connection rejection packet to the wireless terminal 21.

The outline of operation of the entire wireless terminal authentication system shown in FIG. 5 will next be described.

First, the wireless terminal 21 issues a network connection request to the authentication server 31 connected to the communication network 41 through the wireless base station 11.

In this case, the wireless base station 11 acquires authentication information and terminal ID from a wireless connection request packet including the authentication information which is transmitted from the wireless terminal 21 and transmits the acquired information in the form of an authentication request packet to the authentication server 31.

After acquiring the authentication information from the authentication request packet transmitted from the wireless base station 11, the authentication server 31 checks authentication information that has previously been registered in an authentication information management table 32 provided in the authentication server 31 to determine where there is authentication information coinciding with the acquired authentication information.

If there is no authentication information coinciding with the acquired authentication information in the authentication information management table 32 of the authentication server 31, the authentication server 31 determines "authentication rejection" for the wireless terminal 21. On the other hand, if there is authentication information coinciding with the acquired authentication information, the authentication server 31 determines "authentication acceptance".

If it is determined to be "authentication acceptance", the authentication server 31 generates an authentication acceptance reply packet and transmits the generated authentication acceptance reply packet to the wireless base station 11. On the other hand, if it is determined to be "authentication acceptance", the authentication server 31 generates an authentication rejection reply packet and transmits the generated authentication rejection reply packet to the wireless base station 11.

If the wireless base station 11 receives the authentication acceptance reply packet, it transmits a wireless connection acceptance replay packet to the wireless terminal 21. On the other hand, if the wireless base station 11 receives the authentication rejection reply packet, it transmits a wireless connection rejection replay packet to the wireless terminal 21.

As described above, the wireless terminal 21 that has received the wireless connection acceptance packet can be connected to the communication network 41 through the wireless base station 11 and can perform communication with a device connected to the communication network 41. On the other hand, with regard to the wireless terminal 21 that has transmitted authentication information that does not coincide with the authentication information registered in the authentication information management table 32 of the authentication server 31, connection to the communication network 41 is rejected for the purpose of preventing unauthorized use of the wireless terminal (see Patent Document 1).

In the authentication system disclosed in Patent Document 1, unauthorized use of the wireless terminal can be prevented by deleting the authentication information of the relevant wireless terminal from the authentication information management table 32 of the authentication server 31, even if a given wireless terminal is stolen or lost. However, in the case where a given wireless terminal is shared by a plurality of users, it is difficult to identify when, where, and by whom the terminal is used. Thus, in the case of theft or loss, it takes a long time to find out the unauthorized use. For this reason, the above authentication system can be said to be vulnerable to the unauthorized use.

Here, there is known a method in which authentication information and validity period for authentication are registered in the authentication information table 32 of the authentication server 31 in association with each other. In this method, in the case where the wireless terminal 21 issues a connection request within a given authentication validity period and authentication acceptance is determined, the authentication validity period is updated for prolonged use.

In the case where there is no connection request from the wireless terminal 21 within the validity period and authentication acceptance is not determined, expiration of the validity period of the authentication is determined to invalidate the authentication information of the wireless terminal 21. As described above, by setting time limit for authentication and combining of determinations whether or not the received authentication information and registered authentication information coincide with each other and whether or not the validity period has elapsed, unauthorized access to the communication network 41 can be prevented.

To shorten the validity time in such a conventional technique is an effective way for preventing unauthorized use of the wireless terminal at the time of its theft or loss. However, expiration of the authentication validity period may occur frequently due to reasons other than the theft or loss. Accordingly, invalidation work of the authentication information becomes an everyday affair to increase the workload of an administrator who manages the authentication information. Further, the wireless terminal frequently becomes disabled due to the invalidation, interfering with everyday activities. As described above, the abovementioned conventional authentication system is an impractical one.

As another system for preventing unauthorized use of the wireless terminal, there are known a security system for a mobile wireless terminal, a mobile wireless terminal, and a recording medium storing a security program (see Patent Document 2 (JP-2001-346257-A)).

However, the authentication method for a wireless terminal, wireless base station, and communication system disclosed in Patent Document 1 employs an authentication system obtained by combining authentication information and terminal ID, so that if the wireless terminal is stolen, unauthorized use of the wireless terminal cannot be prevented.

Further, the security system for a mobile wireless terminal, mobile wireless terminal, and recording medium storing a security program disclosed in Patent Document 2 prevents the unauthorized use by utilizing authentication information associated with wireless terminal unique information and by periodically changing authentication information to be input by a user. However, in the case where program update or data update in a business terminal needs to be performed through a communication network at night in an unmanned manner, authentication information cannot be input due to unmanned operation.

Thus, in the conventional wireless terminal authentication system that rejects authentication according to the set validity period or confirms the validity of authentication based on the ID/password input operation of a user, an effective means of preventing unauthorized use of the wireless terminal at the time of its theft or loss and preventing unauthorized use in a wireless terminal for business use allowing unmanned operation has not been established.

SUMMARY OF THE INVENTION

The present invention has been made in view of the above problems, and an object thereof is to provide an authentication system and authentication method for performing authentication of a wireless terminal that issues an authentication request to an authentication server connected to a communication network through a wireless base station, having a practical and effective function of preventing unauthorized use of the wireless terminal at the time of its theft or loss.

According to an aspect of the present invention, there is provided an authentication system for performing authentication of a wireless terminal that issues an authentication request to an authentication server connected to a communication network through a wireless base station for access to the communication network, wherein the wireless base station comprises: an authentication information acquisition means for acquiring authentication information from a wireless connection request packet including the authentication information transmitted from the wireless terminal; and an authentication request transmission means for transmitting the authentication information acquired by the authentication information acquisition means and RAS unique information which is information unique to the wireless base station that has previously been registered in the wireless base station to the authentication server as an authentication request packet, the authentication server comprises: a base station information acquisition means for acquiring the authentication information and RAS unique information of the wireless base station from the authentication request packet transmitted by the authentication request transmission means; and a base station information determination means for comparing the authentication information and RAS unique information acquired by the base station information acquisition means with wireless terminal authentication information in which the authentication information and RAS unique information have previously been registered in association with each other to determine whether or not they coincide with each other, and in the case where the acquired authentication information and RAS unique information and previously registered wireless terminal authentication information coincide with each other, the base station information determination means authenticates the wireless terminal.

In the authentication system according to the present invention, the authentication server may further comprise: a RAS unique information determination means and an authentication result transmission means. The RAS unique information determination means determines authentication rejection in the case where the authentication information acquired by the base station information acquisition means and previously registered wireless terminal authentication information do not coincide with each other; the RAS unique information determination means determines authentication acceptance in the case where the authentication information acquired by the base station information acquisition means and previously registered wireless terminal authentication information coincide with each other and where corresponding RAS information coincide with each other to update the validity period of the wireless terminal authentication information; the RAS unique information determination means determines authentication acceptance in the case where the authentication information acquired by the base station information acquisition means and previously registered wireless terminal authentication information coincide with each other but corresponding RAS information do not coincide with each other and where the authentication request is within the validity period of the wireless terminal authentication information; and the RAS unique information determination means determines authentication rejection in the case where the authentication information acquired by the base station information acquisition means and previously registered wireless terminal authentication information coincide with each other but corresponding RAS information do not coincide with each other and where the authentication request is beyond the validity period of the wireless terminal authentication information. The authentication result transmission means transmits an authentication acceptance replay packet generated by the authentication server to the wireless base station in the case where authentication acceptance is determined by the RAS unique information determination means; and the authentication result transmission means transmits an authentication rejection replay packet generated by the authentication server to the wireless base station in the case where authentication rejection is determined by the RAS unique information determination means. Further, in the authentication system according to the present invention, the wireless base station may further comprise an authentication result base station transmission means. The authentication result base station transmission means transmits a wireless connection acceptance replay packet to the wireless terminal when receiving the authentication acceptance replay packet transmitted by the authentication result transmission means of the authentication server; and the authentication result base station transmission means transmits a wireless connection rejection replay packet to the wireless terminal when receiving the authentication rejection replay packet transmitted by the authentication result transmission means of the authentication server.

Further, in the authentication system according to the present invention, in the case where the RAS unique information determination means determines that the RAS unique information coincide with each other and that the authentication request from the wireless base station is beyond the validity period of the wireless terminal authentication information, the authentication server may determine expiration of the authentication validity period and generates an authentication validity period expiration replay packet so as to transmit to the wireless base station.

Further, in the authentication system according to the present invention, in the case where the RAS unique information determination means determines that the RAS unique information do coincide with each other, the authentication server may determine authentication rejection regardless of whether the authentication request is within or beyond the validity period.

Further, in the authentication system according to the present invention, the authentication server may change the RAS unique information of the wireless base station which has previously been registered in association with the authentication information of the wireless terminal to which the authentication result base station transmission means of the wireless base station has transmitted the wireless connection acceptance replay packet.

As described above, according to the present invention, acceptance or rejection of authentication is determined by the authentication information of the wireless terminal and RAS unique information of the wireless base station. Thus, authentication is not accepted by the authentication server unless an authentication request is made through a particular wireless base station, thereby preventing a stolen wireless terminal from illegally accessing the communication network.

DETAILED DESCRIPTION OF THE PREFERRED EMBODIMENTS

Embodiments of the present invention will be described in detail with reference to the accompanying drawings.

First Embodiment

Figure 1:
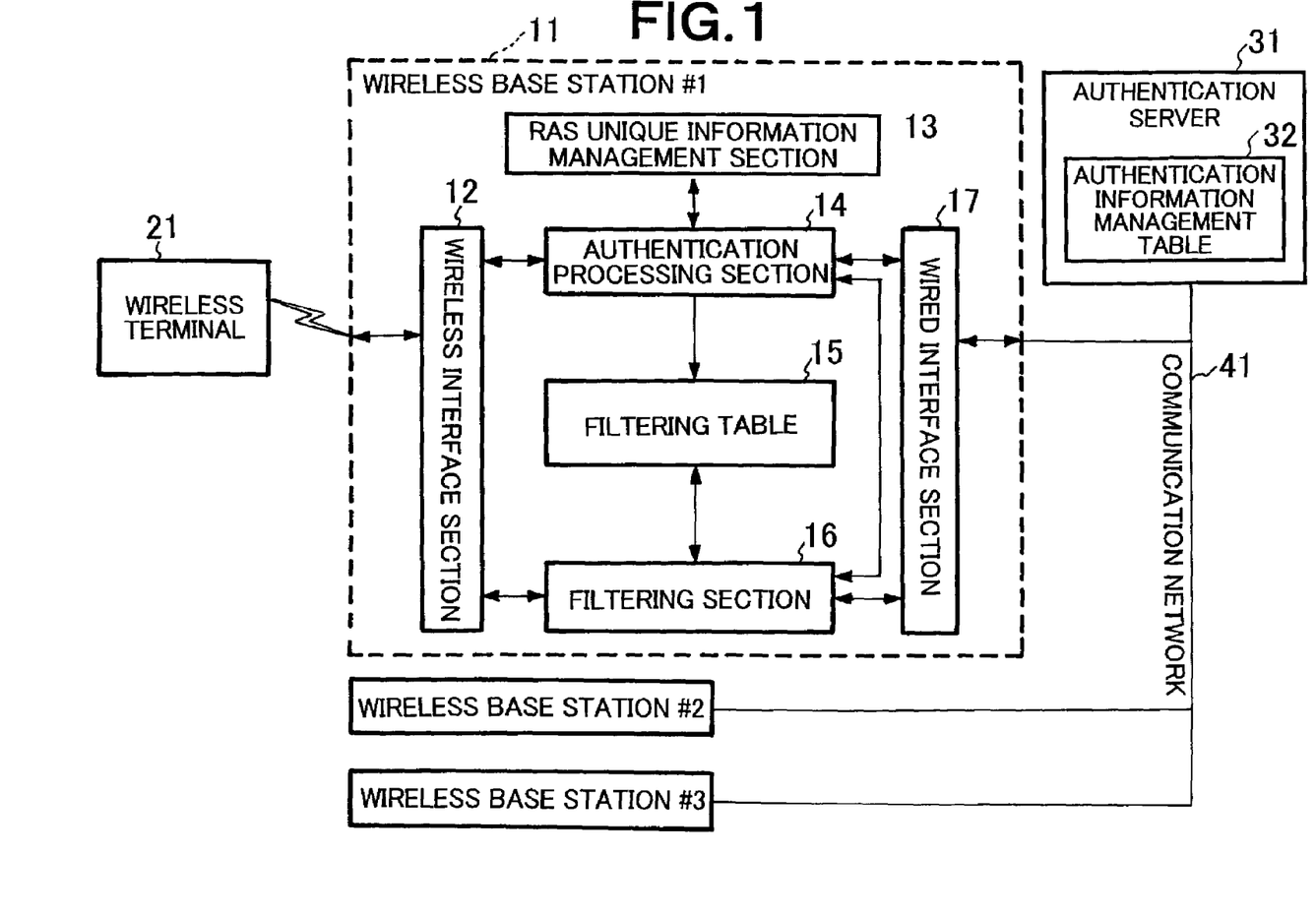
FIG. 1 is a view showing an outline of a wireless terminal authentication system according to a first embodiment of the present invention.

FIG. 1 is a view showing an outline of an authentication system for performing authentication of a wireless terminal according to the present invention. In FIG. 1, the same parts as those in FIG. 5 are indicated by the same reference numerals.

The authentication system for performing authentication of an wireless terminal shown in FIG. 1 includes a first wireless base station #1, a second wireless base station #2, a third wireless base station #3, a wireless terminal 21, an authentication server 31, and a communication network 41.

The first wireless base station #1 (wireless base station 11) includes a wireless interface section 12, an RAS (Remote Access Service) unique information management section 13, an authentication processing section 14, a filtering table 15, a filtering section 16, and a wired interface section 17.

As can be seen from comparison with the abovementioned prior art, the authentication system according to the present embodiments is characterized by further comprising the RAS unique information management section 13.

The second and third wireless base stations #2 and #3 have the same configuration as that of the wireless base station 11 and, as shown in FIG. 1, a plurality of wireless base stations are connected to the communication network 41.

The wireless base station 11 is connected to the authentication server 31 through the communication network 41.

Upon receiving an authentication request including authentication information such as user ID (identification) and password from the wireless terminal 21, the wireless base station 11 asks the authentication server 31 in which authentication information has been registered for the authentication determination to thereby accept or reject an access of the wireless terminal 21 to a network service.

When the wireless terminal 21 is once authenticated by the authentication server 31 and access to a communication network is allowed, the wireless base station 11 stores the terminal ID of the wireless terminal 21 in the filtering table 15. In the future authentication process, the filtering section 16 compares received terminal ID and terminal ID stored in the filtering table 15 to perform acceptance/rejection determination for the same wireless terminal 21.

The wireless interface section 12 of the wireless base station 11 performs wireless communication with the wireless terminal 21 to exchange packets therewith. Then, the wireless interface section 12 determines whether a received packet is a wireless connection request packet. If the received packet is the wireless connection request packet, the wireless interface section 12 extracts authentication information and terminal ID from the received wireless connection request packet. If the received packet is not the wireless connection request packet, the wireless interface section 12 extracts terminal ID from the received packet.

The RAS unique information management section 13 retains and manages unique information that the wireless base station 11 has. This unique information is RAS unique information. More specifically, MAC (Media Access Control) address, serial number, host name (computer name), and the like correspond to the RAS unique information.

If a received packet is a wireless connection request packet, the authentication processing section 14 acquires authentication information and terminal ID from the wireless interface section 12, generates an authentication request packet including the received authentication information and RAS unique information, and transmits the generated authentication request packet to the authentication server 31 through the wired interface section 17 and communication network 41.

The authentication processing section 14 receives an authentication reply from the authentication server 31 through the communication network 41 and wired interface section 17. If the authentication reply indicates "authentication acceptance", the authentication processing section 14 stores the terminal ID in the filtering table 15 and transmits a wireless connection acceptance packet to the wireless terminal 21. If the authentication reply indicates "authentication rejection", the authentication processing section 14 does not store the terminal ID in the filtering table 15 but transmits a wireless connection rejection packet to the wireless terminal 21.

When receiving a communication packet of the wireless terminal 21 from the wireless interface section 12, the filtering section 16 detects a transmission source terminal ID and compares the detected terminal ID and terminal ID stored in the filtering table 15. If the same terminal ID as the detected terminal ID is stored in the filtering table 15, the filtering section 16 transfers the communication packet to the communication network 41.

On the other hand, if the same terminal ID as the detected terminal ID is not stored in the filtering table 15, the filtering section 16 discards the communication packet.

Further, the filtering section 16 detects a transmission destination terminal ID from a packet on the communication network 41 and compares the detected transmission destination ID and terminal ID stored in the filtering table 15. If the same terminal ID as the detected transmission destination terminal ID is stored in the filtering table 15, the filtering section 16 transfers the communication packet to the wireless interface section 12. On the other hand, if the same terminal ID as the detected transmission destination terminal ID is not stored in the filtering table 15, the filtering section 16 does not transfer the packet to the wireless interface section 12.

An example of operation of the authentication system according to the present invention will be described in detail with reference to flowcharts shown in FIGS. 2 and 3 and an authentication information management table 32 shown in FIG. 4.

When connecting to the wireless base station 11, the wireless terminal 21 transmits a wireless connection request packet (corresponding to the abovementioned authentication request) including authentication information.

Figure 2:
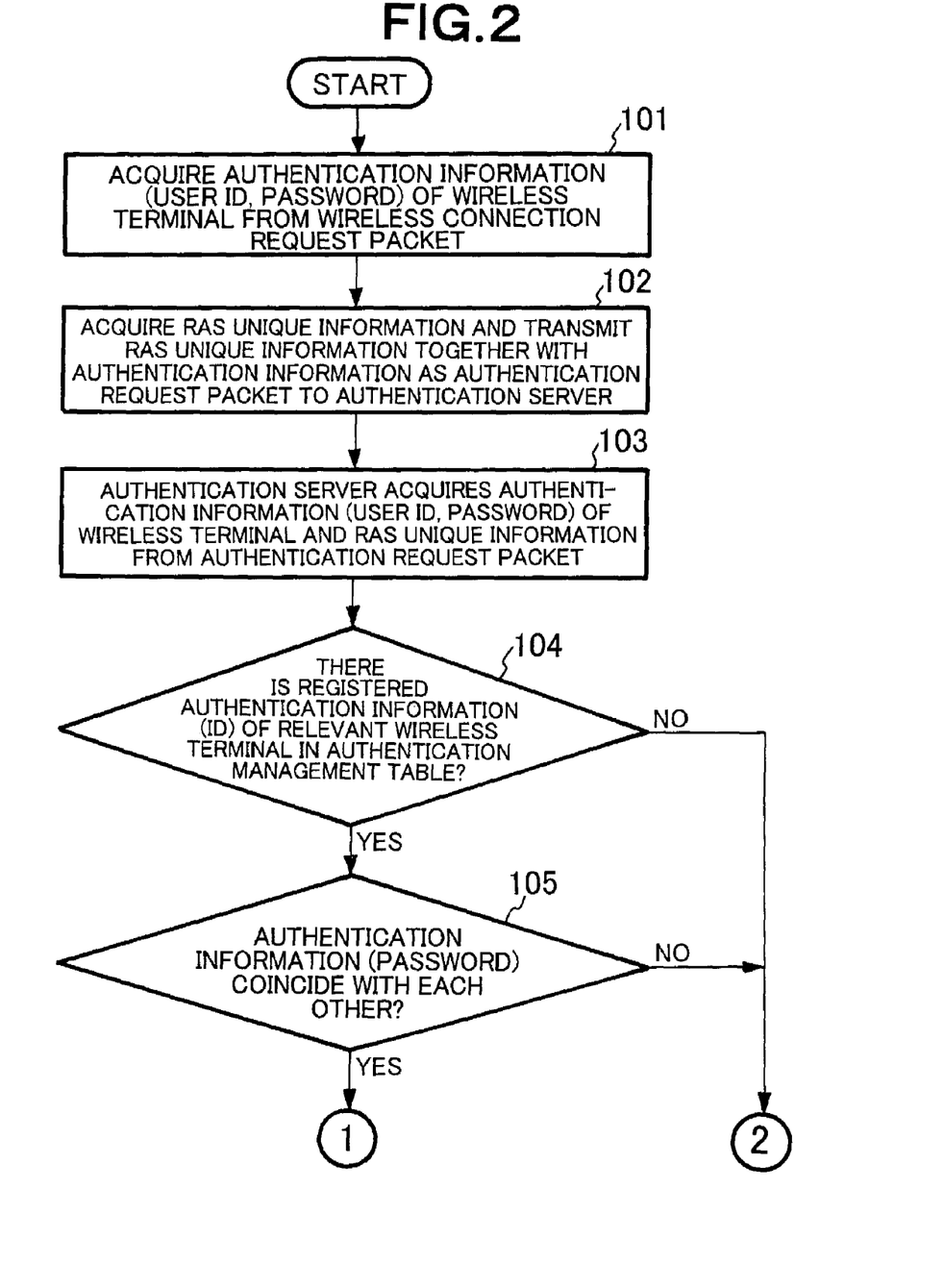
FIG. 2 is a flowchart showing operation according to the first embodiment of the present invention.

The wireless base station 11 receives the wireless connection request packet in the wireless interface section 12 and acquires authentication information (user ID and password) in the authentication processing section 14 (101 of FIG. 2).

The authentication processing section 14 acquires the RAS unique information of the wireless base station 11 from the RAS unique information management section 13 and adds it to the authentication information to generate an authentication request packet. Then, the authentication processing section 14 transmits the generated authentication request packet to the authentication server 31 through the wired interface section 17 and communication network 14 (102 of FIG. 2).

Figure 4:
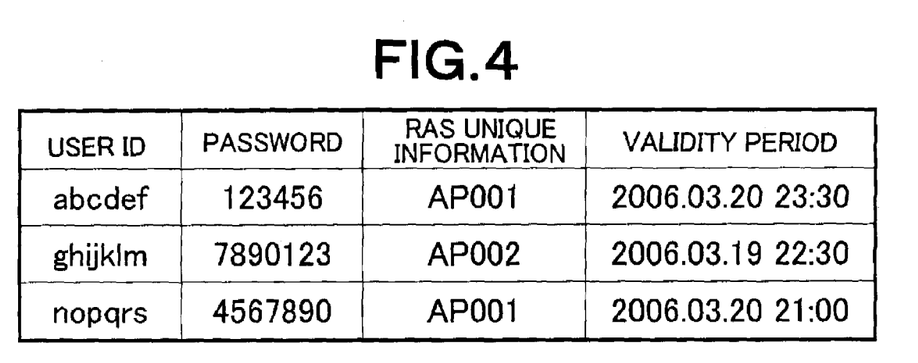
FIG. 4 is an example of an authentication information management table according to the first embodiment of the present invention.

The authentication server 31 acquires the authentication information (user ID, password) of the wireless terminal 21 and RAS unique information of the wireless base station 11 from the authentication request packet (103 of FIG. 2) and checks the authentication information management table 32 shown in FIG. 4 for whether or not there is an user ID coinciding with the user ID of the wireless terminal 21 (104 of FIG. 2).

The authentication information management table 32 shown in FIG. 4 is registered in the authentication server 31 and stores user IDs and passwords of respective wireless terminals, RAS unique information in which the respective wireless terminals are registered, and validity periods. Note that the user ID, password, RAS unique information and validity period are merely exemplars, and the content thereof is not limited to the above.

If there is no user ID coinciding with the user ID of the wireless terminal 21 in the authentication server 31, the authentication server 31 determines "authentication rejection". Then, the authentication server 31 generates an authentication reject replay packet and transmits it to the wireless base station 11 (110 of FIG. 3).

On the other hand, if there exists a user ID coinciding with the user ID of the wireless terminal 21 in the authentication server 31, the authentication server 31 determines whether or not the corresponding passwords coincide with each other (105 of FIG. 2).

If the corresponding passwords do not coincide with each other, the authentication server 31 determines "authentication rejection". Then, the authentication server 31 generates an authentication reject replay packet and transmits it to the wireless base station 11 (110 of FIG. 3).

Figure 3:
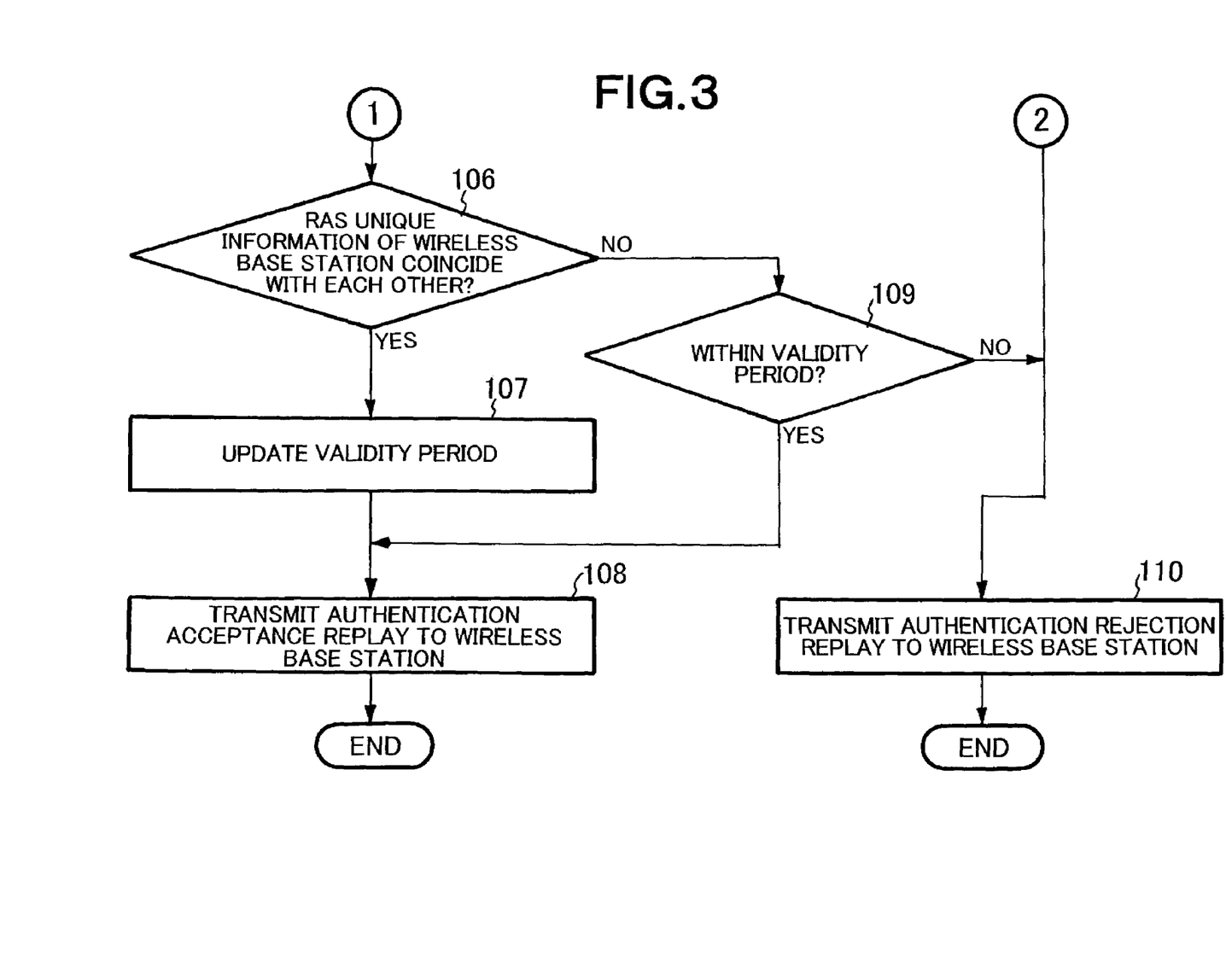
FIG. 3 is a flowchart showing operation according to the first embodiment of the present invention.

On the other hand, if the corresponding passwords coincide with each other, the authentication server 31 determines whether or not the corresponding RAS unique information of the wireless base station 11 coincide with each other (106 of FIG. 3).

If the corresponding RAS unique information do not coincide with each other, the authentication server 31 determines whether or not the authentication request is within its validity period (109 of FIG. 3).

If the authentication information of the wireless terminal 21 is beyond its validity period, the authentication server 31 determines "authentication rejection". Then, the authentication server 31 generates an authentication rejection replay packet and transmits it to the wireless base station 11 (110 of FIG. 3).

On the other hand, if the authentication information of the wireless terminal 21 is within its validity period, the authentication server 31 determines "authentication acceptance". Then, the authentication server 31 generates an authentication acceptance replay packet and transmits it to the wireless base station 11 (108 of FIG. 3).

If the corresponding RAS unique information coincide with each other, the authentication server 31 determines "authentication acceptance". Then, the authentication server 31 updates the validity time (107 of FIG. 3), generates an authentication acceptance replay packet, and transmits it to the wireless base station 11 (108 of FIG. 3).

The length of the validity period may be arbitrarily set in the authentication server 31. For example, the validity period may start from the day on which "authentication acceptance" is determined until six months have elapsed, or to the last day of each quarterly period.

In the case where the wireless base station 11 receives the authentication rejection reply packet from the authentication server 31, it generates a wireless connection rejection packet in the authentication processing section 14 and transmits the generated wireless connection rejection packet from the wireless interface section 12 to the wireless terminal 21.

On the other hand, in the case where the wireless base station 11 receives the authentication acceptance reply packet from the authentication server 31, it generates a wireless connection acceptance packet in the authentication processing section 14 and transmits the generated wireless connection acceptance packet from the wireless interface section 12 to the wireless terminal 21 and, at the same time, registers the terminal ID of the wireless terminal 21 in the filtering table 15 so as to allow communication between the wireless terminal 21 and communication network 41 during a time period during which the terminal ID is registered.

As described above, in the present embodiment, the authentication server 31 stores the authentication information (user ID, password) of the wireless terminal 21 as listed in the authentication information management table 32 of FIG. 4 and RAS unique information if the wireless base station 11 registers the terminal ID of the wireless terminal 21 that has received the authentication acceptance replay packet from the authentication server 31 in the filtering table 15.

As described above, according to the present embodiment, acceptance or rejection of authentication in the authentication system is determined by the authentication information (user ID, password) of the wireless terminal 21, RAS unique information of the wireless base station 11, and validity period of the authentication information. In order to access the communication network 41 once again using the wireless terminal 21 after the validity period has elapsed, it is only necessary to issue authentication request through a particular wireless base station having the same RAS unique information as that has been registered in the authentication server 31.

Thus, even after the validity period has elapsed, it is possible to update the validity period when the RAS unique information registered in the authentication server 31 and RAS unique information of the wireless base station 11 coincide with each other, thereby eliminating the need for an administrator to manage the validity period of authentication information. This leads to a reduction of a workload on the administrator, resulting in a reduction of management cost.

Further, by installing the particular wireless base station 11 in an improved security environment, it is possible to prevent a stolen wireless terminal from illegally accessing the communication network after the validity period has elapsed.

Another Embodiment

In the first embodiment of the present invention, as shown in the flowchart of FIG. 4, the authentication server 31 compares the RAS unique information stored in the authentication information management table 32 and RAS unique information received from the wireless base station 11 through the communication network 41 and determines the validity period of the authentication information of the wireless terminal 21 in the case where a result of the comparison between the RAS unique information does not show coincidence. Alternatively, however, the authentication server 31 may determine the update of the validity period of the authentication information in the case where the RAS unique comparison result does not show coincidence, or authentication server 31 may transmit the authentication rejection replay in the case where the RAS unique comparison result does not show coincidence.

In this case, the authentication server 31 can identify the wireless terminal 21 and wireless base station 11 by confirming the coincidence between the RAS unique information. Therefore, the authentication server 31 can determine the update of the validity.

Further, in the case where the wireless terminal 21 is used in factories or research facilities, the wireless base station 11 can be identified. Thus, if a result of the comparison between the RAS unique information does not show coincidence, the authentication server 31 can determine that the wireless terminal 21 has been illegally used due to theft or loss to determine "authentication rejection" for the wireless terminal 21.

Further, the authentication server 31 may not only update the validity period in the authentication management table 32 but also change the RAS unique information registered therein.

Specifically, in the case where the wireless terminal 21 goes out of the coverage of the wireless base station 11 due to removal or job transfer of a user of the terminal 21, the authentication server 31 changes the RAS unique information of the authentication information management table 32 to RAS unique information of a new wireless base station 11 that covers the wireless terminal 21 only for the wireless terminal 21 to which the authentication server 31 has issued the authentication acceptance reply through the previous wireless base station 11. As a result, the user can use the wireless terminal 21 to access the communication network through a new wireless base station 11 performing troublesome operations.

Alternatively, the authentication server 31 may change the RAS unique information of the authentication information management table 32 for the purpose of canceling prevention of unauthorized use due to theft or loss of the wireless terminal 21.

Specifically, for example, in the case where the stolen or lost wireless terminal 21 issues an authentication request from a wireless base station 11 covering the area other than that associated with the wireless terminal 21, the authentication request is rejected by the authentication server for prevention of unauthorized use.

However, in the case where the wireless terminal 21 is stolen or lost and the identity of the user has been confirmed afterwards, the RAS unique information of the authentication information table 32 of the authentication server 31 may be changed so as to cancel a function of preventing unauthorized use of the wireless terminal 21 found after its theft or less.

Further, by setting new RAS unique information without changing the authentication information of the wireless terminal 21, it is possible to change the wireless base station 11 covering the wireless terminal 21 while maintaining the existing authentication information of the wireless terminal 21, thereby improving the prevention function against the unauthorized use due to the theft or loss.

What is claimed is:

1. An authentication system for performing authentication of a wireless terminal that issues an authentication request to an authentication server connected to a communication network through a wireless base station for access to the communication network, wherein
the wireless base station comprises:
authentication information acquisition means for acquiring authentication information from a wireless connection request packet including the authentication information transmitted from the wireless terminal; and
authentication request transmission means for transmitting the authentication information acquired by the authentication information acquisition means and remote access service (RAS) unique information which is information unique to the wireless base station that has previously been registered in the wireless base station to the authentication server as an authentication request packet,
the authentication server comprises:
base station information acquisition means for acquiring the authentication information and RAS unique information of the wireless base station from the authentication request packet transmitted by the authentication request transmission means; and
base station information determination means for comparing the authentication information and RAS unique information acquired by the base station information acquisition means with wireless terminal authentication information in which the authentication information and RAS unique information have previously been registered in association with each other to determine whether or not they coincide with each other, and
in the case where the acquired authentication information and RAS unique information and previously registered wireless terminal authentication information coincide with each other, the base station information determination means authenticates the wireless terminal;
wherein the authentication server further comprises RAS unique information determination means and authentication result transmission means,
the RAS unique information determination means determining authentication rejection in the case where the authentication information acquired by the base station information acquisition means and previously registered wireless terminal authentication information do not coincide with each other,
the RAS unique information determination means determining authentication acceptance in the case where the authentication information acquired by the base station information acquisition means and previously registered wireless terminal authentication information coincide with each other and where corresponding RAS information coincide with each other to update the validity period of the wireless terminal authentication information,
the RAS unique information determination means determining authentication acceptance in the case where the authentication information acquired by the base station information acquisition means and previously registered wireless terminal authentication information coincide with each other but corresponding RAS information do not coincide with each other and where the authentication request is within the validity period of the wireless terminal authentication information,
the RAS unique information determination means determining authentication rejection in the case where the authentication information acquired by the base station information acquisition means and previously registered wireless terminal authentication information coincide with each other but corresponding RAS information do not coincide with each other and where the authentication request is beyond the validity period of the wireless terminal authentication information,
the authentication result transmission means transmitting an authentication acceptance replay packet generated by the authentication server to the wireless base station in the case where authentication acceptance is determined by the RAS unique information determination means, and
the authentication result transmission means transmitting an authentication rejection replay packet generated by the authentication server to the wireless base station in the case where authentication rejection is determined by the RAS unique information determination means, and
the wireless base station further comprises authentication result base station transmission means,
the authentication result base station transmission means transmitting a wireless connection acceptance replay packet to the wireless terminal when receiving the authentication acceptance replay packet transmitted by the authentication result transmission means of the authentication server, and
the authentication result base station transmission means transmitting a wireless connection rejection replay packet to the wireless terminal when receiving the authentication rejection replay packet transmitted by the authentication result transmission means of the authentication server.

2. The authentication system according to claim 1, wherein,
in the case where the RAS unique information determination means determines that the RAS unique information coincide with each other and that the authentication request from the wireless base station is beyond the validity period of the wireless terminal authentication information, the authentication server determines expiration of the authentication validity period and generates an authentication validity period expiration replay packet so as to transmit to the wireless base station.

3. The authentication system according to claim 1, wherein,
in the case where the RAS unique information determination means determines that the RAS unique information do coincide with each other, the authentication server determines authentication rejection regardless of whether the wireless terminal authentication information is within or beyond the validity period.

4. The authentication system according to claim 1, wherein the authentication server can change the RAS unique information of the wireless base station which has previously been registered in association with the authentication information of the wireless terminal to which the authentication result base station transmission means of the wireless base station has transmitted the wireless connection acceptance replay packet.

5. An authentication method used in an authentication system for performing authentication of a wireless terminal that issues an authentication request to an authentication server connected to a communication network through a wireless base station for access to the communication network, comprising:

a first step in which the wireless base station acquires authentication information from a wireless connection request packet including the authentication information transmitted from the wireless terminal;

a second step in which the wireless base station transmits the authentication information acquired by the first step and remote access service (RAS) unique information which is information unique to the wireless base station that has previously been registered in the wireless base station to the authentication server as an authentication request packet;

a third step in which the authentication server acquires the authentication information and RAS unique information of the wireless base station from the authentication request packet transmitted by the second step; and a fourth step in which the authentication server compares the authentication information and RAS unique information acquired by the third step with wireless terminal authentication information in which the authentication information and RAS unique information have previously been registered in association with each other to determine whether or not they coincide with each other, wherein, in the case where the authentication information and RAS unique information acquired by the third step and previously registered wireless terminal authentication information coincide with each other, the fourth step authenticates the wireless terminal;

further comprising a fifth step, a sixth step, and a seventh step, the fifth step determining authentication rejection in the case where the authentication information acquired by the third step and previously registered wireless terminal authentication information do not coincide with each other in the fourth step, the fifth step determining authentication acceptance in the case where the authentication information acquired by the third step and previously registered wireless terminal authentication information coincide with each other and where corresponding RAS information coincide with each other in the fourth step to update the validity period of the wireless terminal authentication information, the fifth step determining authentication acceptance in the case where the authentication information acquired by the third step and previously registered wireless terminal authentication information coincide with each other but corresponding RAS information do not coincide with each other in the fourth step and where the authentication request is within the validity period of the wireless terminal authentication information, the fifth step determining authentication rejection in the case where the authentication information acquired by the third step and previously registered wireless terminal authentication information coincide with each other but corresponding RAS information do not coincide with each other in the fourth step and where the authentication request is beyond the validity period of the wireless terminal authentication information, the sixth step transmitting an authentication acceptance replay packet generated by the authentication server to the wireless base station in the case where authentication acceptance is determined by fifth step, and the six step transmitting an authentication rejection replay packet generated by the authentication server to the wireless base station in the case where authentication rejection is determined by the fifth step, the seventh step transmitting a wireless connection acceptance replay packet to the wireless terminal when the wireless base station receives the authentication acceptance replay packet transmitted by the sixth step, and the seventh step transmitting a wireless connection rejection replay packet to the wireless terminal when the wireless base station receives the authentication rejection replay packet transmitted by the sixth step.

6. The authentication method according to claim 5, wherein in the case where it is determined in the fifth step that the RAS unique information coincide with each other and that the authentication request from the wireless base station is beyond the validity period of the wireless terminal authentication information, the authentication server determines expiration of the authentication validity period and generates an authentication validity period expiration replay packet so as to transmit to the wireless base station.

7. The authentication method according to claim 5, wherein in the case where it is determined in the fifth step that the RAS unique information do coincide with each other, the authentication server determines authentication rejection regardless of whether the wireless terminal authentication information is within or beyond the validity period.

8. The authentication method according to claim 5, wherein the authentication server can change the RAS unique information of the wireless base station which has previously been registered in association with the authentication information of the wireless terminal to which the authentication result base station transmission means of the wireless base station has transmitted the wireless connection acceptance replay packet in the seventh step.

* * * * *